United States Patent [19]

Nagai et al.

[11] Patent Number: 5,268,757
[45] Date of Patent: Dec. 7, 1993

[54] HIGH SPEED IMAGING APPARATUS WITHOUT LOWERING OF DYNAMIC RANGE

[75] Inventors: Seiichiro Nagai, Tochigi; Masayuki Nishiki, Ootawara, both of Japan

[73] Assignee: Kabushiki Kaisha Toshiba, Kanagawa, Japan

[21] Appl. No.: 717,806

[22] Filed: Jun. 19, 1991

[30] Foreign Application Priority Data

Jun. 20, 1990 [JP] Japan .................. 2-159944

[51] Int. Cl.⁵ .................. H04N 7/12; H04N 7/04
[52] U.S. Cl. .................. 358/141; 358/133; 358/134
[58] Field of Search .................. 358/133, 134, 13, 168, 358/12, 141, 209

[56] References Cited

U.S. PATENT DOCUMENTS 5,032,908  7/1991  Miller .................. 358/133

FOREIGN PATENT DOCUMENTS 0152787  9/1982  Japan .................. 358/133

Primary Examiner—Alvin E. Oberley
Assistant Examiner—Minsum Oh
Attorney, Agent, or Firm—Finnegan, Henderson, Farabow, Garrett & Dunner

[57] ABSTRACT

A high speed imaging apparatus capable of speeding up the imaging rate, without causing the lowering of the dynamic range of the image data. The imaging apparatus includes a first signal processing unit for dividing each channel of the image information signals outputted from the imaging element into a plurality of signal channels; a plurality of A/D converters, each of which is provided in correspondence to each one of the signal channels of the image information signals and converts the image signals of respective one of the signal channels into digital image signals; and a second signal processing unit for combining the digital image signals obtained by the A/D converters into a single channel of digital image signals representing the image to be taken.

12 Claims, 6 Drawing Sheets

HIGH SPEED IMAGING APPARATUS WITHOUT LOWERING OF DYNAMIC RANGE

BACKGROUND OF THE INVENTION

1. Field of the Invention

The present invention relates to an imaging apparatus such as an X-ray imaging apparatus for taking an X-ray image of an object to be imaged by using an X-ray and displaying the imaged X-ray image as a visual image on a display monitor.

2. Description of the Background Art

A conventional example of an X-ray imaging apparatus is shown in FIG. 1. This X-ray imaging apparatus 100, which is to be incorporated into an X-ray diagnostic apparatus, comprises: an imaging unit 130 including an X-ray tube 110 for irradiating an X-ray onto a patient P to be imaged, an image intensifier 101 for converting an X-ray image formed by the X-ray irradiated from the X-ray tube 110 through the patient P into an optical image, and an optical system 104 for optically processing the optical image obtained by the image intensifier 101; an imaging tube 102 for converting the optically processed optical image from the imaging unit 130 into electric image information signals; a signal processing circuit 105 for processing the image information signals from the imaging tube 102 by applying processings such as a noise suppression processing and an A/D input matching processing; an A/D converter 103 for converting the processed image information signals from the signal processing circuit 105 into digital image signals; a memory 106 for memorizing the digital image signals obtained by the A/D converter 103; a D/A converter 107 for converting the digital image signals memorized by the memory 106 into analog image signals; and a monitor 120 for displaying an image of the patient P given by the analog image signals obtained by the D/A converter 107.

Here, the imaging tube 102, the signal processing circuit 105, the A/D converter 103, the memory 106, and the D/A converter 107 are usually contained inside a TV camera unit (not shown).

Now, the fastest A/D converter available at a time of this application is the 12 bit, 10 MHz A/D converter, so that the maximum imaging rate for obtaining an image of 1000×1000 image elements with a concentration levels given by 12 bit in a digital fluorography apparatus such as an X-ray imaging apparatus described above is limited to 7.5 frames/sec. In other words, in order to speed up this imaging rate from 7.5 frames/sec to 30 frames/sec, it is necessary to have an A/D converter having a processing speed four times faster than the fastest A/D converter currently available, but since such a high speed A/D converter is not available yet, there has been no prospect conventionally for speeding up the imaging rate in the digital fluorography apparatus.

In addition, there has conventionally been a problem that as the imaging rate is increased by reading out the image data at higher speed, the dynamic range of the image data become lower.

SUMMARY OF THE INVENTION

It is therefore an object of the present invention to provide a high speed imaging apparatus capable of speeding up the imaging rate, without causing the lowering of the dynamic range of the image data.

According to one aspect of the present invention there is provided an imaging apparatus, comprising: imaging element means for outputting image information signals representing an image to be taken; a first signal processing unit for dividing the image information signals outputted from the imaging element means into a plurality of signal channels; a plurality of A/D converters, each of which is provided in correspondence to each one of the signal channels of the image information signals and converts the image signals of respective one of the signal channels into digital image signals; and a second signal processing unit for combining the digital image signals obtained by the A/D converters into a single channel of digital image signals representing the image to be taken.

According to another aspect of the present invention there is provided an imaging apparatus, comprising: imaging element means for outputting image information signals representing an image to be taken in two channels; a first signal processing unit for dividing each channel of the image information signals outputted from the imaging element means into a plurality of signal channels; a plurality of A/D converters, each of which is provided in correspondence to each one of the signal channels of the image information signals and converts the image signals of respective one of the signal channels into digital image signals; and a second signal processing unit for combining the digital image signals obtained by the A/D converters into a single channel of digital image signals representing the image to be taken.

Other features and advantages of the present invention will become apparent from the following description taken in conjunction with the accompanying drawings.

DETAILED DESCRIPTION OF THE PREFERRED EMBODIMENTS

Figure 1:
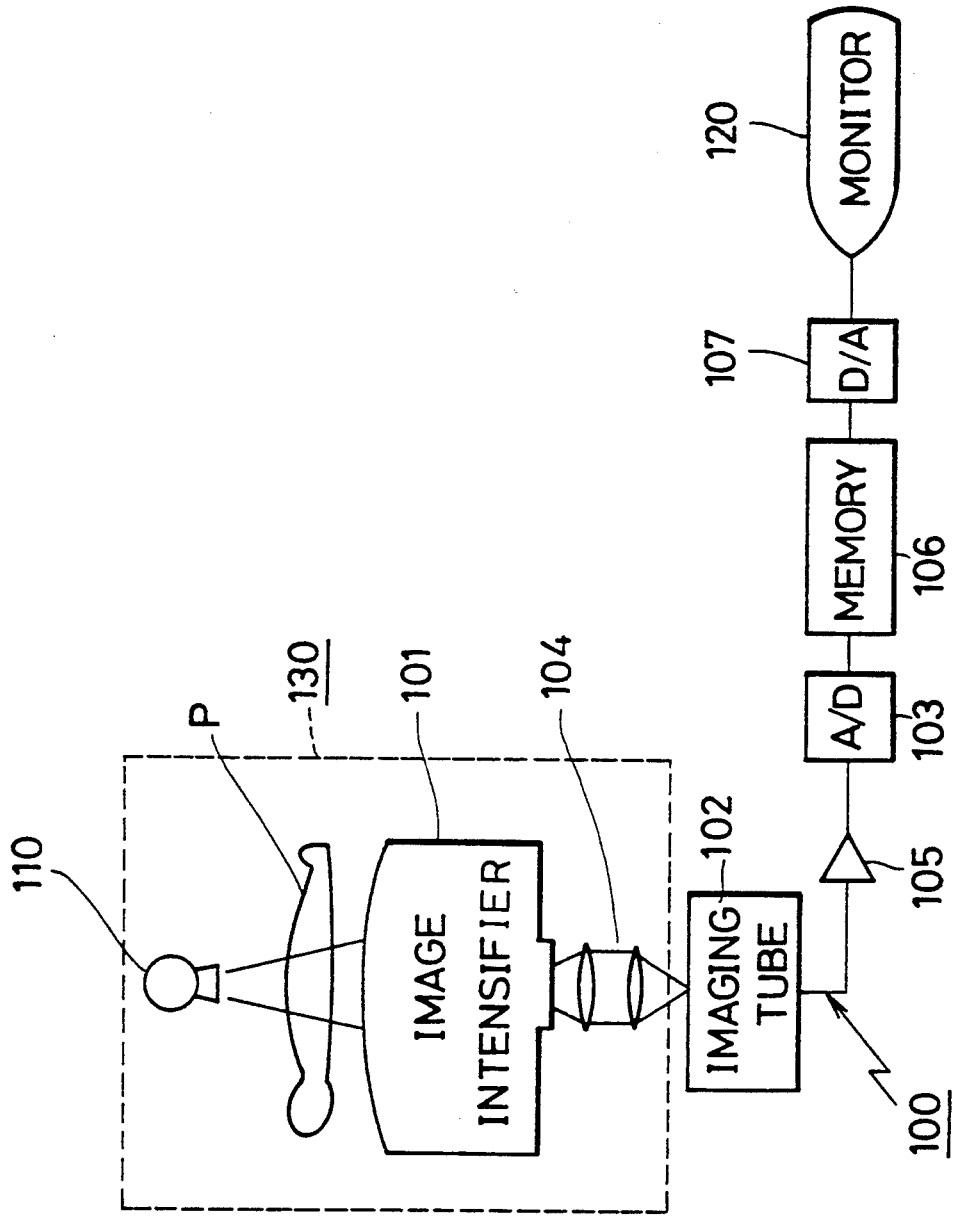
FIG. 1 is a schematic block diagram for an example of a conventional X-ray imaging apparatus.
Figure 2:
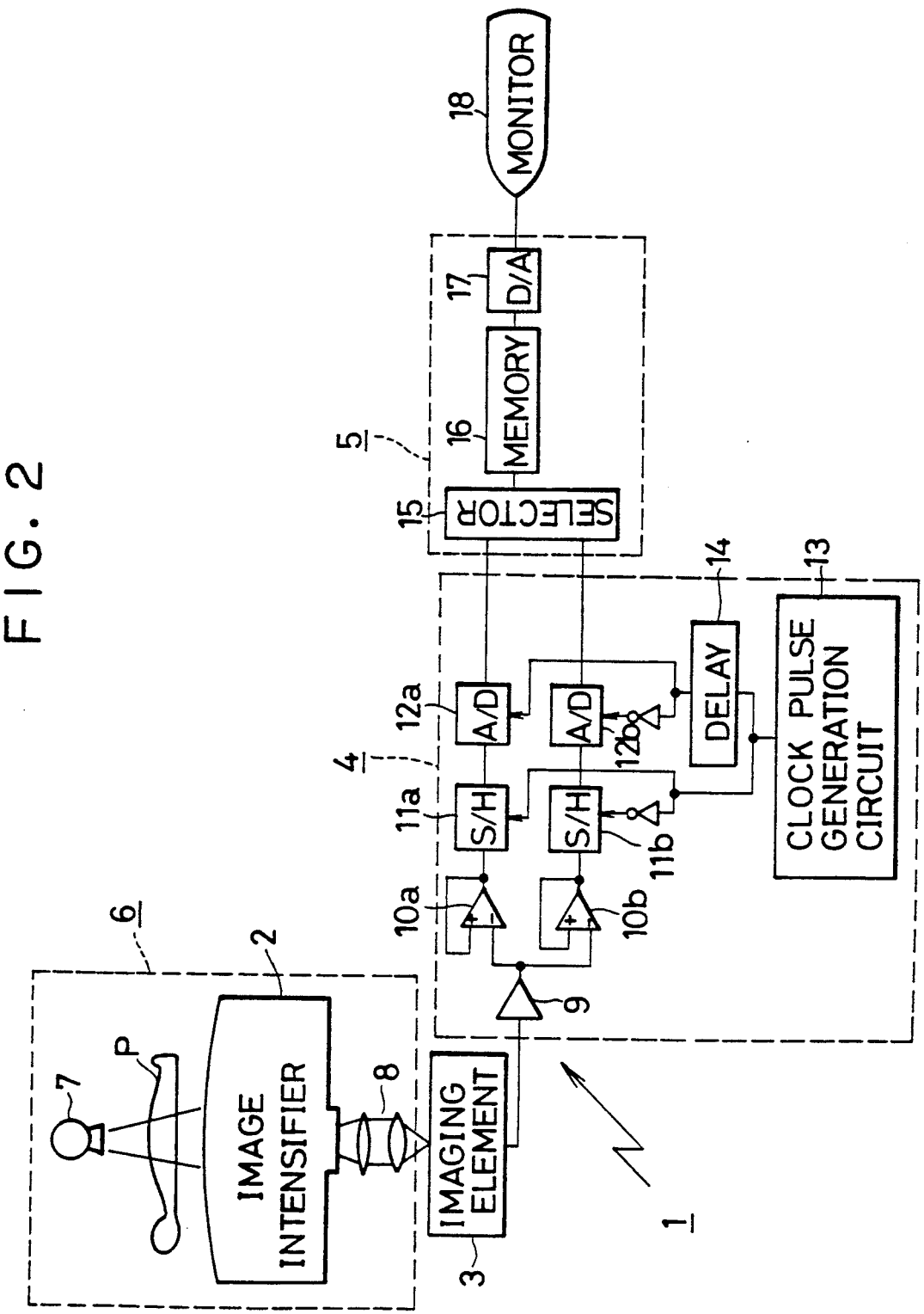
FIG. 2 is a schematic block diagram for the first embodiment of a high speed imaging apparatus according to the present invention.

Referring now to FIG. 2, the first embodiment of a high speed imaging apparatus according to the present invention will be described in detail.

In this first embodiment, a high speed imaging apparatus is realized in a form of an X-ray imaging apparatus 1 to be incorporated into an X-ray diagnostic apparatus.

In this embodiment, an X-ray imaging apparatus comprises: an imaging unit 6 including an X-ray tube 7 for irradiating an X-ray onto a patient P to be imaged, an image intensifier 2 for converting an X-ray image formed by the X-ray irradiated from the X-ray tube 7 through the patient P into an optical image, and an optical system 8 for optically processing the optical image obtained by the image intensifier 2; an imaging element 3 such as a CCD (charge coupled device) for converting the optically processed optical image from the imaging unit 6 into electric image information signals; a first signal processing unit 4 for dividing the image information signals from the imaging element 3 into a plurality (two in this embodiment of FIG. 2) of signal channels; a second signal processing unit 5 for combining the plurality of signal channels from the first signal processing unit 4 into a single image signal channel; and a monitor 18 for displaying an image of the patient P given by the single image channel obtained by the second signal processing unit 5.

Here, the first signal processing unit 4 and the second signal processing unit 5 are usually contained inside a TV camera unit (not shown).

The first signal processing unit 4 further includes: a signal processing circuit 9 for processing the image information signals from the imaging element 3 by applying processings such as those of a noise suppression, an amplification, and a DC level adjustment, which outputs the processed image information signals in two signal channels through two buffer amplifiers 10a and 10b; two sampling/hold circuits 11a and 11b for sampling the image information signals in two signal channels at different timings to be described below; two A/D converters 12a and 12b for converting the sampled image information signals in two signal channels from the sampling/hold circuits 11a and 11b into digital image signals at the different timings to be described below; a clock pulse generation circuit 13 for generating clock pulses to be supplied to the sampling/hold circuits 11a and 11b and the A/D converters 12a and 12b; and a delay 14 for delaying the clock pulses to be supplied from the clock pulse generation circuit 13 to the A/D converters 12a and 12b. The delay 14 is provided here because of the difference between the sampling timings for the sampling/hold circuits 11a and 11b and the conversion timings for the A/D converters 12a and 12b.

The second signal processing unit 5 further includes: a selector 15 for selectively transmitting one of the two signal channels of the digital image signals from the A/D converters 12a and 12b; a memory 16 for memorizing the digital image signals transmitted through the selector 15; a D/A converter 17 for converting the digital image signals memorized by the memory 16 into analog image signals and outputting the obtained analog image signals to the monitor 18 so as to have an image of the patient P given by the analog image signals displayed.

Figure 3:
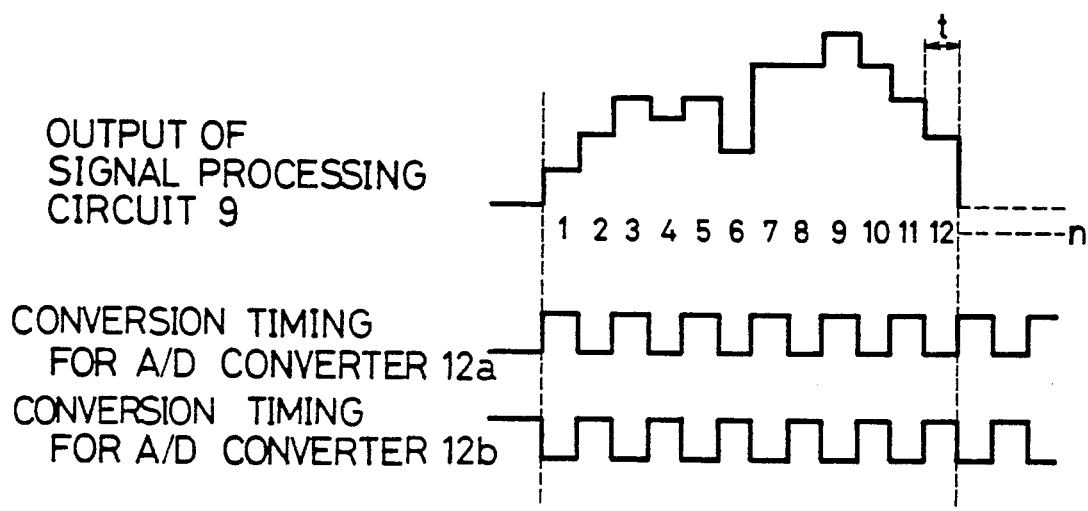
FIG. 3 is a timing chart for the output of a signal processing circuit and sampling timings for the A/D converters in the high speed imaging apparatus of FIG. 2.

Now, in the first signal processing unit 4, the clock pulses are supplied from the clock pulse generation circuit 13 to the sampling/hold circuits 11a and 11b and the A/D converters 12a and 12b such that the sampling timing for the sampling/hold circuit 11a is displaced from the sampling timing for the sampling/hold circuit 11b by a time t corresponding to one picture element, and the conversion timing for the A/D converter 12a is displaced from the conversion timing for the A/D converter 12b by the same time t corresponding to one picture element, as shown in FIG. 3, where numbers 1, 2, . . . , n below the output of the signal processing circuit 9 indicate picture element numbers labelling picture elements in the image information signals.

More specifically, according to FIG. 3, the clock pulses are supplied from the clock pulse generation circuit 13 to the sampling/hold circuits 11a and 11b and the A/D converters 12a and 12b such that the A/D converter 12a converts the picture elements labelled by odd picture element numbers while the A/D converter 12b converts the picture elements labelled by even picture element numbers. As a result, when the frequency of the image information signals outputted by the imaging element 3 is 2×MHz, the sampling frequency in the first signal processing unit 4 can be only a half of that frequency, i.e., X MHz.

Thus, according to this first embodiment, the A/D conversion of the image information signals from the imaging element 3 is carried out by the parallel operations of two A/D converters 12a and 12b. Consequently, even when the processing speed of each of the A/D converters 12a and 12b is the same as a conventionally fastest A/D converter, the image information signals outputted at the frequency twice as large as the sampling frequency for each of the A/D converters 12a and 12b can be handled by the first signal processing unit 4, and therefore the imaging rate of this imaging apparatus 1 can be increased to be twice as much as conventionally realizable, without lowering the dynamic range of the image information signals.

Moreover, because the imaging element 3 outputs the image information signals in a single signal channel, it is possible to avoid the problem of a fluctuation of the image information signals in different channels associated with an imaging element which outputs its output signals in a plurality of signal channels.

By using the high speed imaging apparatus of this embodiment in an X-ray diagnostic apparatus, it becomes possible to shorten the time required for taking an X-ray image of the patient P and consequently the time for making the diagnosis, while the time scale resolution of the motion images can be improved as the frame rate for the image can be increased.

Figure 4:
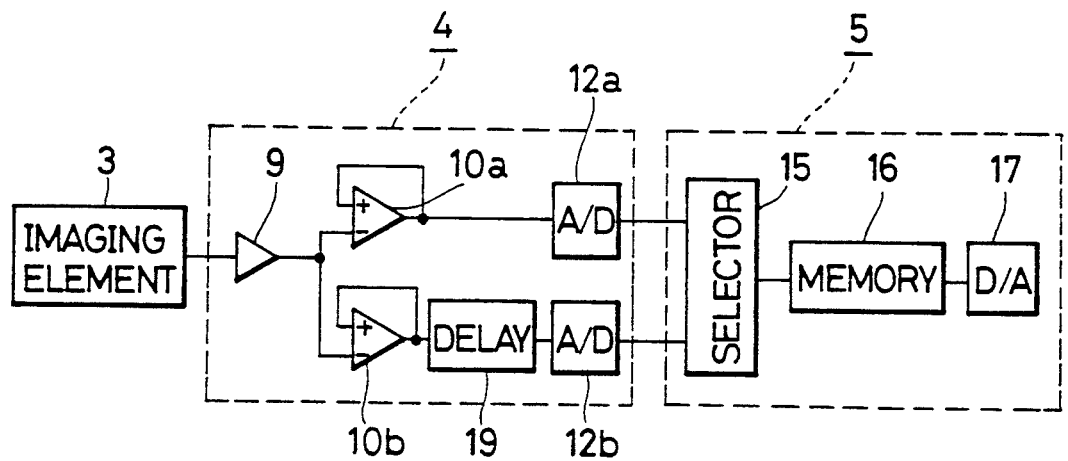
FIG. 4 is a partial schematic block diagram for the second embodiment of a high speed imaging apparatus according to the present invention.

Referring now to FIG. 4, the second embodiment of a high speed imaging apparatus according to the present invention will be described in detail. Here, those elements which are equivalent to the corresponding elements in the first embodiment described above will be designated by the same labels and their description will be omitted. Also, in FIG. 4, the sampling/hold circuits 11a and 11b, the clock pulse generation circuit 13, and the delay 14 are omitted for the sake of simplifying the drawing, although these elements are to be incorporated in this second embodiment just as in the first embodiment described above.

This second embodiment differs from the first embodiment described above in that, instead of supplying the clock pulses to two A/D converters 12a and 12b at different timings, a delay 19 for delaying a transmission of image information signals by a time corresponding to one picture element is inserted in front of one A/D converter 12b as shown in FIG. 4, while the clock pulses are supplied to both of the A/D converters 12a and 12b at the same timing.

With this configuration, the A/D converter 12a converts the picture elements labelled by odd picture element numbers while the A/D converter 12b converts the picture elements labelled by even picture element numbers just as in the first embodiment described above, so that the same effects as the first embodiment described above can also be obtained by this second embodiment.

It is obvious that the same result is also obtainable by inserting the delay 19 in front of the A/D converter 12a instead of inserting it in front of the A/D converter 12b as described above.

Figure 5:
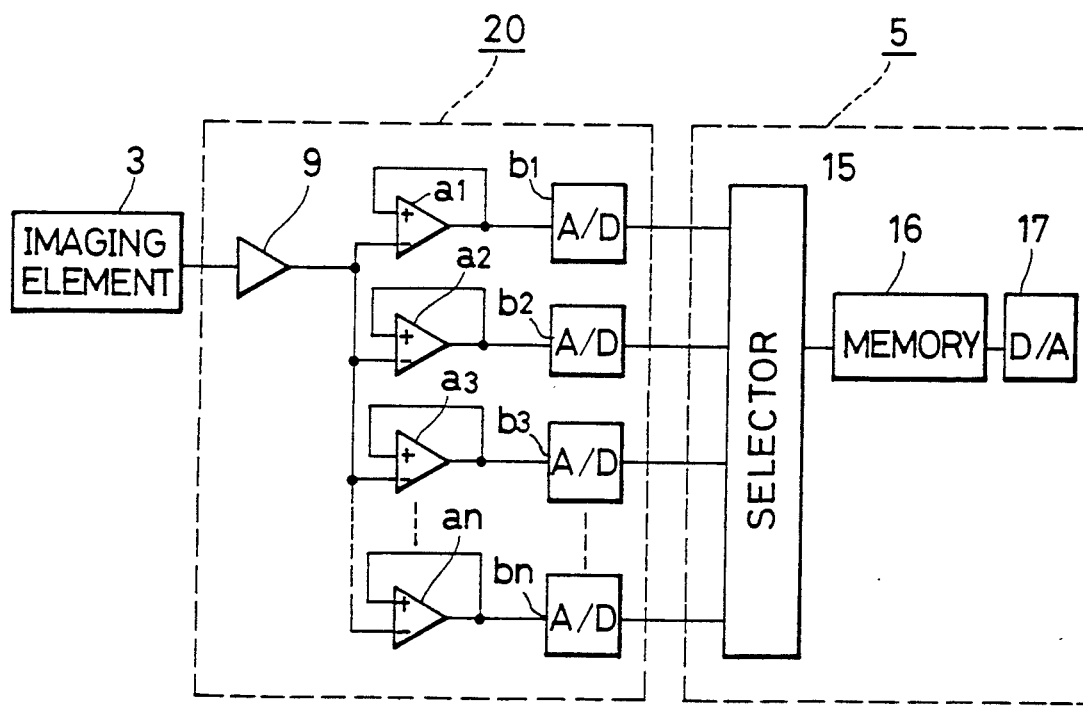
FIG. 5 is a partial schematic block diagram for the third embodiment of a high speed imaging apparatus according to the present invention.

Referring now to FIG. 5, the third embodiment of a high speed imaging apparatus according to the present invention will be described in detail. Here, those elements which are equivalent to the corresponding elements in the first embodiment described above will be designated by the same labels and their description will be omitted. Also, in FIG. 5, the sampling/hold circuits 11a and 11b, the clock pulse generation circuit 13, and the delay 14 are omitted for the sake of simplifying the drawing, although these elements are to be incorporated in this second embodiment just as in the first embodiment described above.

This third embodiment differs from the first embodiment described above in that, instead of providing just two buffer amplifiers 10a and 10b and two A/D converters 12a and 12b in the first signal processing unit 4, the first signal processing unit 20 of this third embodiment has n (n is an integer greater than 2) buffer amplifiers $a_1$ to $a_n$ and n A/D converters $b_1$ to $b_n$ such that the image information signals from the signal processing circuit 9 are divided into n channels and the A/D conversion is carried out by the parallel operations of n A/D converters $b_1$ to $b_n$.

Figure 6:
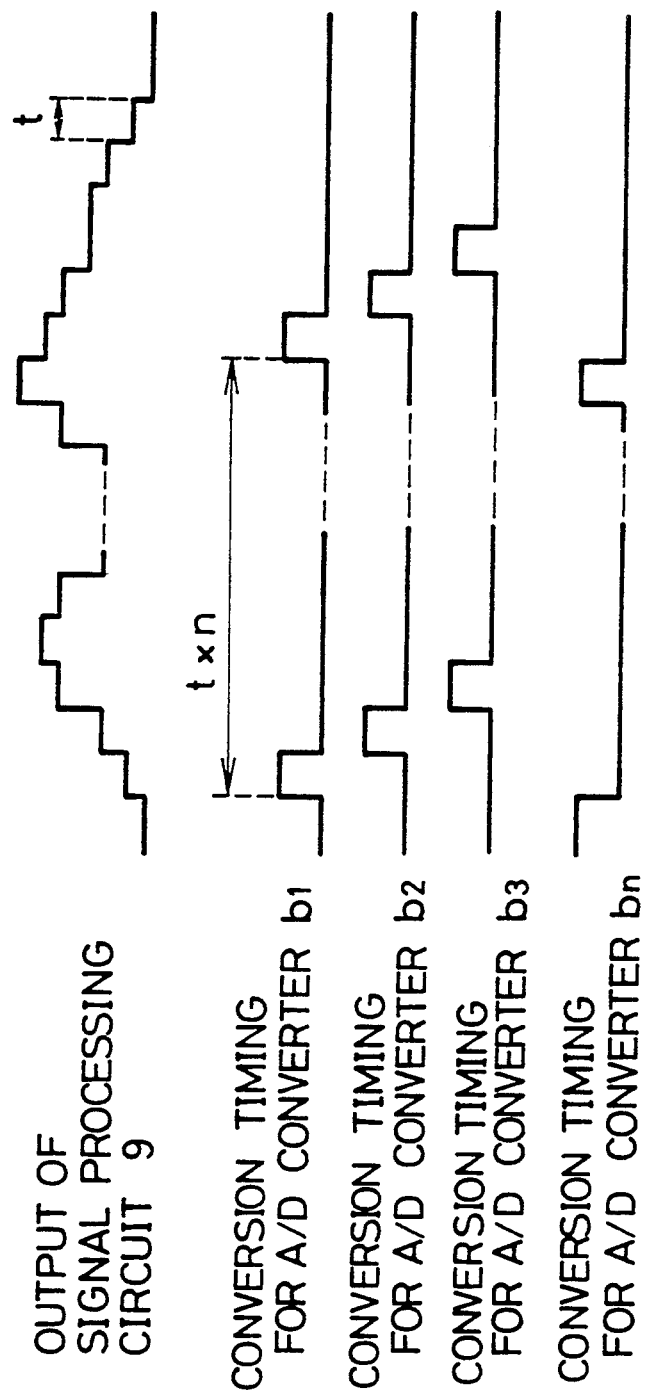
FIG. 6 is a timing chart for the output of a signal processing circuit and sampling timings for the A/D converters in the high speed imaging apparatus of FIG. 5.

Here, the sampling timings for n A/D converters $b_1$ to $b_n$ are set as shown in FIG. 6. Namely, the sampling timing for each A/D converter has a period of $t \times n$ where t is a time corresponding to one picture element, and is displaced by the time t with respect to the sampling timing for the immediately preceding A/D converter.

With this configuration, the A/D converter $b_1$ converts the picture elements labelled by $(1+kn)$-th (k is an integer greater than or equal to 0) picture element numbers, the A/D converter $b_2$ converts the picture elements labelled by $(2+kn)$-th picture element numbers, and so on, while the A/D converter $b_2$ converts the picture elements labelled by $(n+kn)$-th picture element numbers.

Thus, according to this third embodiment, the A/D conversion of the image information signals from the imaging element 3 is carried out by the parallel operations of n A/D converters $b_1$ to $b_n$, such that the sampling frequency in the first signal processing unit 20 can be only 1/n of the frequency of the image information signals. Thus, the image information signals outputted at the frequency n times as large as the sampling frequency for each of the A/D converters $b_1$ to $b_n$ can be handled by the first signal processing unit 20, and therefore the imaging rate of this imaging apparatus of the third embodiment can be increased to be n times as much as conventionally realizable, without lowering the dynamic range of the image information signals.

Figure 7:
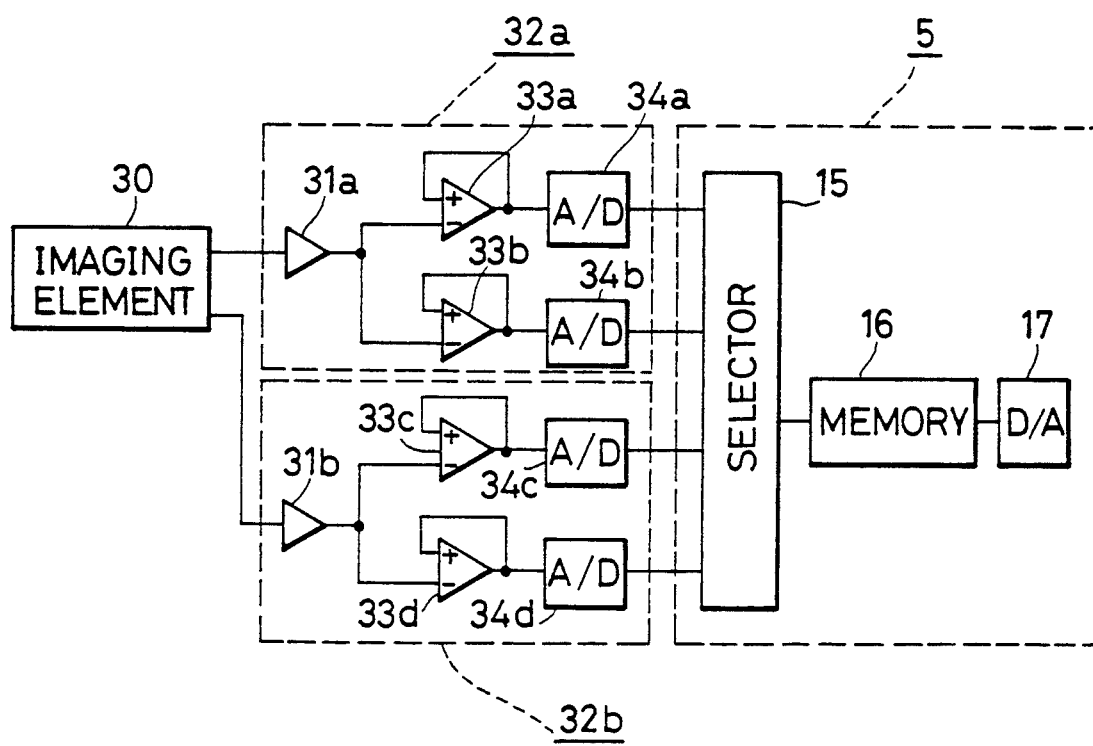
FIG. 7 is a partial schematic block diagram for the fourth embodiment of a high speed imaging apparatus according to the present invention.

Referring now to FIG. 7, the fourth embodiment of a high speed imaging apparatus according to the present invention will be described in detail. Here, those elements which are equivalent to the corresponding elements in the first embodiment described above will be designated by the same labels and their description will be omitted.

This fourth embodiment differs from the first embodiment described above in that, an imaging element 30 which outputs the image information signals in two signal channels is used, and two first signal processing units 32a and 32b are provided in correspondence to two signal channels from the imaging element 30.

The first signal processing unit 32a further includes: a signal processing circuit 31a for processing one signal channel of the image information signals from the imaging element 30 by applying processings such as those of a noise suppression, an amplification, and a DC level adjustment, which outputs the processed image information signals in two signal channels through two buffer amplifiers 33a and 33b; and two A/D converters 34a and 34b for converting the sampled image information signals in two signal channels from the buffer amplifiers 33a and 33b into digital image signals at the different timings. This first signal processing unit 32a also includes the sampling/hold circuits 11a and 11b, the clock pulse generation circuit 13, and the delay 14 similar to those of the first embodiment described above, although they are omitted for the sake of simplifying the drawing. Thus, in this first signal processing unit 32a, the clock pulses are supplied to the A/D converters 34a and 34b such that the conversion timing for the A/D converter 34a is displaced from the conversion timing for the A/D converter 34b by the time t corresponding to one picture element, and therefore the A/D converter 34a converts the picture elements labelled by odd picture element numbers while the A/D converter 34b converts the picture elements labelled by even picture element numbers.

Similarly, the first signal processing unit 32b further includes: a signal processing circuit 31b for processing the other signal channel of the image information signals from the imaging element 30 by applying processings such as those of a noise suppression, an amplification, and a DC level adjustment, which outputs the processed image information signals in two signal channels through two buffer amplifiers 33c and 33d; and two A/D converters 34c and 34d for converting the sampled image information signals in two signal channels from the buffer amplifiers 33c and 33d into digital image signals at the different timings. This first signal processing unit 32b also includes the sampling/hold circuits 11a and 11b, the clock pulse generation circuit 13, and the delay 14 similar to those of the first embodiment described above, although they are omitted for the sake of simplifying the drawing. Thus, in this first signal processing unit 32b, the clock pulses are supplied to the A/D converters 34c and 34d such that the conversion timing for the A/D converter 34c is displaced from the conversion timing for the A/D converter 34d by the time t corresponding to one picture element, and therefore the A/D converter 34c converts the picture elements labelled by odd picture element numbers while the A/D converter 34d converts the picture elements labelled by even picture element numbers.

Thus, according to this fourth embodiment, the A/D conversion of each of the two signal channels of the image information signals outputted from the imaging element 30 is carried out by the parallel operations of two A/D converters, such that the sampling frequency in the first signal processing units 32a and 32b can be only ¼ of the frequency of the image information signals. Thus, the image information signals outputted at the frequency four times as large as the sampling frequency for each of the A/D converters 34a, 34b, 34c, and 34d can be handled by the first signal processing units 32a and 32b, and therefore the imaging rate of this imaging apparatus of the fourth embodiment can be increased to be four times as much as conventionally realizable, without lowering the dynamic range of the image information signals.

In the embodiments described above, it is preferable to use a CCD (charged coupled device) as the imaging element 3 or 30, because it is free from a problem of deterioration of the dynamic range even in a case of high speed reading of the image signals.

It is also to be noted that many modifications and variations of the above embodiments may be made without departing from the novel and advantageous features of the present invention. Accordingly, all such modifications and variations are intended to be included within the scope of the appended claims.

What is claimed is:

1. An imaging apparatus, comprising:
   imaging element means for outputting image information signals at a given image rate based upon a given signal frequency representing an image to be taken;
   a first signal processing unit for supplying the image information signals output from the imaging element means to a plurality of signal channels having a total predetermined number of signal channels, said plurality of signal channels each receiving the identical image information signals;
   a plurality of A/D converters, each corresponding to a respective one of said plurality of signal channels and for converting the image information signals into digital image signals at a conversion frequency corresponding to the given signal frequency divided by said total predetermined number of signal channels; and
   a second signal processing unit for combining the digital image signals output from the A/D converters into a single channel of digital image signals at said given signal frequency representing the image to be taken.

2. The imaging apparatus of claim 1, wherein each one of the A/D converters converts the image information signals of respective one of the signal channels at a conversion timing different from those of other A/D converters.

3. The imaging apparatus of claim 2, wherein said conversion timing for each one of the A/D converters is displaced from that of a neighboring one of the A/D converters by a time corresponding to one picture element.

4. The imaging apparatus of claim 1, further comprising delay means coupled to selected ones of the plurality of A/D converters such that the image information signals of each one of the plurality of signal channels arrive at respective ones of the A/D converters at different times.

5. The imaging apparatus of claim 1, further comprising a sampling/hold circuit inserted in front of each one of the A/D converters such that a sampling timing at each sampling/hold circuit associated with one A/D converter is displaced from those of other sampling/hold circuits associated with other A/D converters.

6. The imaging apparatus of claim 5, wherein said sampling timing for each sampling/hold circuit is displaced from that of a neighboring sampling/hold circuit by a time corresponding to one picture element.

7. An imaging apparatus, comprising:
   imaging element means for outputting image information signals at a given image rate based upon a given signal frequency representing an image to be taken in two channels;
   a pair of first signal processing units corresponding to said two channels for supplying the image information signals output from the imaging element means to a plurality of signal channels having a total predetermined number of signal channels, said plurality of signal channels each receiving the identical image information signals;
   a plurality of A/D converters, each corresponding to a respective one of said plurality of signal channels and for converting the image information signals into digital image signals at a conversion frequency corresponding to the given signal frequency divided by said total predetermined number of signal channels; and
   a second signal processing unit for combining the digital image signals output from the A/D converters into a single channel of digital image signals at said given signal frequency representing the image to be taken.

8. The imaging apparatus of claim 7, wherein each one of the A/D converters converts the image information signals of respective one of the signal channels at a conversion timing different from those of other A/D converters.

9. The imaging apparatus of claim 8, wherein said conversion timing for each one of the A/D converters is displaced from that of a neighboring one of the A/D converters by a time corresponding to one picture element.

10. The imaging apparatus of claim 7, further comprising delay means coupled to selected ones of the plurality of A/D converters such that the image information signals of each one of the plurality of signal channels arrive at respective ones of the A/D converters at different times.

11. The imaging apparatus of claim 7, further comprising a sampling/hold circuit inserted in front of each one of the A/D converters such that a sampling timing at each sampling/hold circuit associated with one A/D converter is displaced from those of other sampling/hold circuits associated with other A/D converters.

12. The imaging apparatus of claim 11, wherein said sampling timing for each sampling/hold circuit is displaced from that of a neighboring sampling/hold circuit by a time corresponding to one picture element.

* * * * *